UNITED STATES PATENT OFFICE.

JNO. H. CHEEVER, OF BOSTON, MASSACHUSETTS.

IMPROVEMENT IN THE MANUFACTURE OF INDIA-RUBBER BELTING OR BANDING.

Specification forming part of Letters Patent No. 14,389, dated March 11, 1856.

*To all whom it may concern:*

Be it known that I, JOHN H. CHEEVER, of Boston, in the county of Suffolk and State of Massachusetts, have invented certain new and useful Improvements in the Manufacture of Rubber Belting or Banding; and I do hereby declare that the following is a full and exact specification of the same, wherein I have set forth the nature and principles of my said improvements, by which my invention may be distinguished from others of a similar class, together with such parts as I claim and desire to have secured to me by Letters Patent.

Leather banding or belting in ordinary use is objectionable on account of its great expense, and the numerous splices or joints necessary in making a belt or band of any considerable length. To obviate these objections, belts and bands have heretofore been manufactured by coating long pieces of heavy duck with a thin sheet of rubber, then folded in several thicknesses to form the belt desired; but these bands or belts do not possess the requisite strength, and, on account of their peculiar formation, are very liable to accidents. The folds of the duck also separate, particularly when the edges are at all worn. My object has been to form a material as nearly like leather as possible, which would possess the requisite strength, and also be susceptible of being made of any required length in one piece, and, further, which would present a better friction-surface to the drum over which the belt passes than any belts now in use.

The material of which my belts or bands are composed is india-rubber compounded with the fibers of cotton or flax. My process is as follows: I take the rubber, when compounded with sulphur, in any of the ordinary compounds used in vulcanizing rubber goods, and when it is in the state ready to be submitted to the vulcanizing process—that is, a substance like stiff dough or paste—and mix it with fibers of cotton or flax, by grinding the materials between heated rollers, in the mode usually practiced by rubber-manufacturers, until the fiber is thoroughly incorporated with the rubber. The proportions I prefer are three pounds of rubber to one pound of flax or cotton, although these proportions may be varied according to the quality of fabric desired.

Instead of mixing pure cotton or flax with the rubber, an economical and simple method of obtaining a like result is that of grinding, between heated rollers, the rags or scraps of cloth covered with rubber compound, which are made to waste by manufacturers of shoes and other rubber goods. To these rags may be added, in grinding, more or less rubber compound, according to the nature of the rags and the quality of the fabric desired.

The fibrous compound, obtained in either of the above modes, is passed through heated calender-rolls and formed into a sheet of the required length and width, and of the thickness of one-sixteenth part of an inch. This sheet is to form one side of the belt, and in this process of grinding and passing the fabric through the heated calender-rollers the fibers of the cotton and flax are laid in a direction parallel to the length of the belt or band. This position of the fibers gives great strength to the belt lengthwise; but in order to prevent it from being torn, and for other reasons, it is necessary to have strength in a crosswise direction also. For this purpose I take a similar sheet, prepared in the same way, and cut it into pieces as long as the width of the first sheet. These pieces are cut with beveled edges and laid crosswise on the first sheet, with the edges overlapping each other. A third sheet, similar to the first, is then laid on top. The whole is then passed again through the heated calender-rollers, for the purpose of consolidating and uniting the fabric, and is then vulcanized in the mode well known to all india-rubber manufacturers.

I have described a belt or band three-sixteenths of an inch thick and made of three layers; but the thickness of the belt may be increased or diminished, according to the wish of the manufacturer.

I have described the mode of forming the belt or band with its fibers arranged so that a portion of them are laid lengthwise and a portion crosswise, this being the best method; but the crosswise fibers may be dispensed with, and yet a very good band or belt produced.

In manufacturing the most economical method is to make the sheet or belt of nearly the width of the calender-rolls, which are usually a yard or more in width. These sheets may then be cut into the desired width for belts, either before or after vulcanizing. The fabric thus obtained will be found to be of great strength and to possess a remarkable resemblance to leather in the internal arrangement of its fibers.

One great advantage of this fabric over india-rubber belts or bands, heretofore described, is that it can be cut into a number of smaller bands if any accident happens to it. This, for obvious reasons, is impossible where the belt is formed of layers of duck. My belt or band, on account of the peculiar nature of its fabric, is not liable to slip on the drums or pulleys, as is the case with leather belting, and thus saves power and gives uniformity to the motions of machinery.

I do not claim the modes of preparing the rubber, or of compounding or vulcanizing the fabric, nor the machinery used therefor, as these are all well known to manufacturers of rubber goods; nor do I claim the compounding of fibers of cotton or flax with india-rubber, as this has been done for the purpose of packing steam-joints and for other similar uses; but it has never been done in the manner described in the foregoing specification, nor has it ever before been used to constitute the fabric known in commerce as "belting" or "banding;" nor do I desire to claim by this patent the new process of making fibrous rubber goods in such a form that the fibers are arranged crossing each other in the manner above described, for the purpose of enabling the fabric to resist tension in all directions, and giving it flexibility without elasticity, as this new process and fabric I intend to make the subject of a separate application for Letters Patent on my part; but What I do claim, and desire to have secured to me by Letters Patent, is—

The improvement in the manufacture of rubber belting or banding, which consists in compounding fibers of cotton or flax with india-rubber, substantially in the manner and by the processes above described.

JOHN H. CHEEVER.

Witnesses:
EZRA LINCOLN,
JOSEPH GAVETT.